W. H. COOK.
ELECTRIC ILLUMINATION.
APPLICATION FILED JUNE 14, 1920.

1,417,457.

Patented May 23, 1922.
2 SHEETS—SHEET 1.

Witness
C. A. Bateman

Inventor
Walter H. Cook
By
Attorney

W. H. COOK.
ELECTRIC ILLUMINATION.
APPLICATION FILED JUNE 14, 1920.

1,417,457.

Patented May 23, 1922.
2 SHEETS—SHEET 2.

Witness
C. O. Bateman

Inventor
Walter H. Cook
By
Attorney

UNITED STATES PATENT OFFICE.

WALTER H. COOK, OF NEW ORLEANS, LOUISIANA.

ELECTRIC ILLUMINATION.

1,417,457. Specification of Letters Patent. Patented May 23, 1922.

Application filed June 14, 1920. Serial No. 388,917.

*To all whom it may concern:*

Be it known that I, WALTER H. COOK, a citizen of the United States, residing at New Orleans, in the parish of Orleans and State of Louisiana, have invented certain new and useful Improvements in Electric Illuminations, of which the following is a specification.

My present invention relates to improvements in illuminating devices, and the primary object of the invention is to provide means whereby light for illuminating purposes may be efficiently projected or distributed from the illuminating device, as a point or axis. The illuminating device comprises more particularly a revolving projector, preferably in the form of a light concentrating and intensifying reflector and a reversely revolving shutter which intermittently intercepts the light beam projected from the reflector, the reflector and shutter being revolved at such speed that the frequency at which the light beam is projected, will produce the effect of continuous illumination in the eyes of observers, owing to the persistence of vision. The invention enables light to be projected in different directions to thus illuminate simultaneously different areas from a single lamp or source of light, thus resulting in economy in electric current or other medium used to supply the source of light.

To these and other ends, the invention consists in certain improvements and combinations and arrangements of parts, all as will be hereinafter more fully described, the features of novelty being pointed out particularly in the claims at the end of the specification.

In the accompanying drawings—

Similar parts are designated by the same reference characters in the several views.

Illuminating devices embodying the present invention are capable of use generally where illumination is desirable or necessary, although they are particularly adapted for use in the illuminating of streets and roadways.

The preferred embodiments of the invention are shown in the accompanying drawing and will be hereinafter described in detail, but it is to be understood that the invention is not restricted to the precise constructions shown, as equivalent constructions are contemplated and will be included within the scope of the claims.

Figure 1:
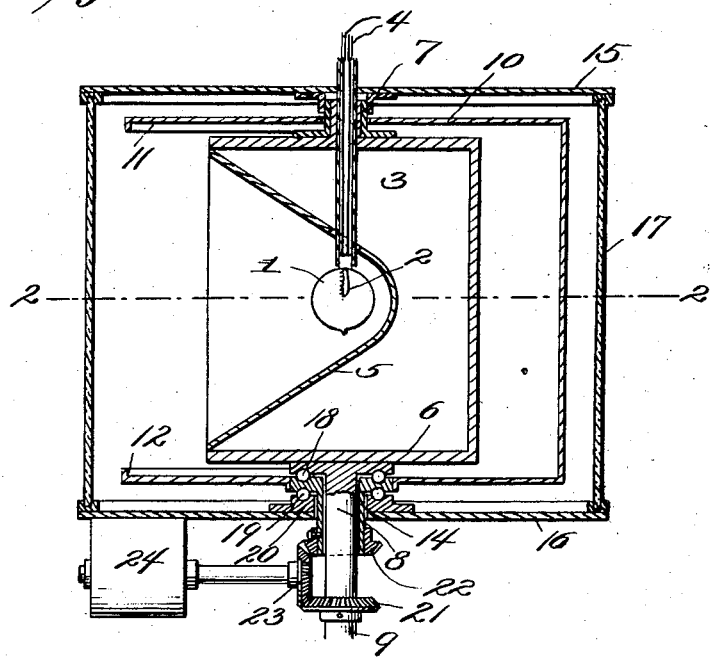
Figure 1 represents a central vertical section through the illuminating device constructed in accordance with one embodiment of the invention.
Figure 2:
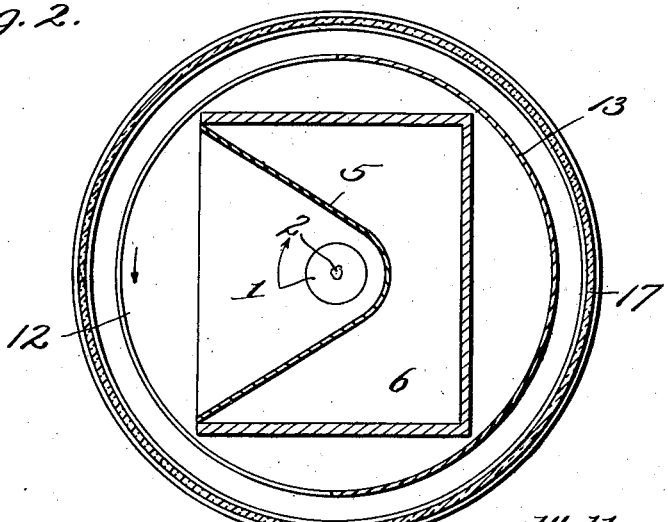
Figure 2 represents a transverse section taken on the line 2—2 of Figure 1.

In the embodiment of the invention shown in Figures 1 and 2, the illuminating device comprises a suitable source of light 1, that shown being in the form of an incandescent lamp, whose filament 2 constitutes the axis or focus from which the light is to be projected. This lamp may be mounted in different ways. As shown, it is mounted in a stationary tube 3 through which the wires 4, which supply electric current to the lamp, may extend. The light from the lamp is concentrated and intensified by a light projector, preferably in the form of a reflector 5, this reflector being mounted in the carrier 6 which is revoluble about an axis which is concentric with the focus of the lamp. Preferably and as shown, the carrier is provided with journals 7 and 8 which are fixed to the top and bottom thereof, the upper journal 7 being hollow or tubular to permit the lamp-supporting tube 3 to extend therethrough, and the lower journal 8 is attached to or forms part of a shaft 9, the latter being journaled or supported upon a suitable post, or other structure. A shutter 10 is mounted to revolve concentrically with the axis about which the reflector revolves, the shutter being preferably of a generally cylindrical form, as shown, having upper and lower heads 11 and 12, and in the construction shown in Figures 1 and 2, a segment of the peripheral wall of the reflector is cut away so as to permit light from the reflector to be projected or transmitted, while the remaining portion 13 of the periphery of the reflector provides a covering portion or blind which intercepts the light from the reflector, when this portion of the shutter is in front of the reflector. The shutter may be mounted in different ways, it being shown in the present instance, as provided with a lower tubular journal 14 which surrounds the lower journal 8 of the reflector carrier. In order to eliminate or reduce to a minimum air resistance to the rotation of the reflector and the shutter, these elements of the illuminating device are preferably enclosed in a casing or housing which comprises preferably upper and lower members 15 and 16 and a glass or other transparent peripheral portion 17, the casing or housing being mounted in stationary position upon a post or other suitable support. An anti-friction bearing 18 is preferably interposed between the reflector carrier and the shutter, to reduce friction due to the reverse rotation of these elements, and an anti-friction bearing 19 is preferably interposed between the bearing for the shutter, and a bearing 20 on the casing or housing to reduce friction due to the rotation of the shutter relatively to the housing.

The light reflector and the shutter are provided with means for revolving them simultaneously in reverse directions. Different means may be provided for this purpose, the shaft 9 connected to the reflector carrier being provided in the present instance with a bevel gear 21, and the journal 14 attached to the shutter being provided with a similar bevel gear 22, a bevel gear 23 on the shaft of an electric or other motor 24 cooperating with the opposed bevel gears 21 and 22, whereby rotation of the motor shaft will cause simultaneous rotation of the reflector and shutter in reverse directions.

In this embodiment of the invention, areas at diametrically opposite sides of the illuminating device may be illuminated by the projection of light beams alternately in diametrically opposite directions, but by revolving the reflector and shutter at a sufficiently high speed, the frequency with which the light beams are projected in each direction will be sufficiently high to give the effect on the eyes of observers of continuous illumination, due to the persistence of vision. For example, assuming that the reflector and the shutter revolve in the directions indicated by the respective arrows in Figure 2, it would be understood that when the reflector and shutter occupy the relative position shown in Figure 2, the beam of light will be projected toward the left. The following half revolution of the reflector and the concurrent half revolution of the shutter will cause the shutter to intercept the beam of light from the reflector during the midway positions of the reflector and shutter, and when the half revolution of the reflector and shutter has been completed, the reflector will face toward the right in Figure 2, while the shutter will occupy a position behind the reflector and to the left in said figure, so that the reflector will then be uncovered and will project a beam of light toward the right. The following half revolution of the reflector and the concurrent half revolution of the shutter will return the reflector and the shutter to the positions shown in Figure 2 and during this reversal in the positions of the reflector and shutter, the beam of light from the reflector will be intercepted by the shutter. The effect is to project beams of light alternately in opposite directions from the illuminating device as an axis, the beam of light from the reflector being cut out or intercepted between its diametrically-opposite positions.

Figure 3:
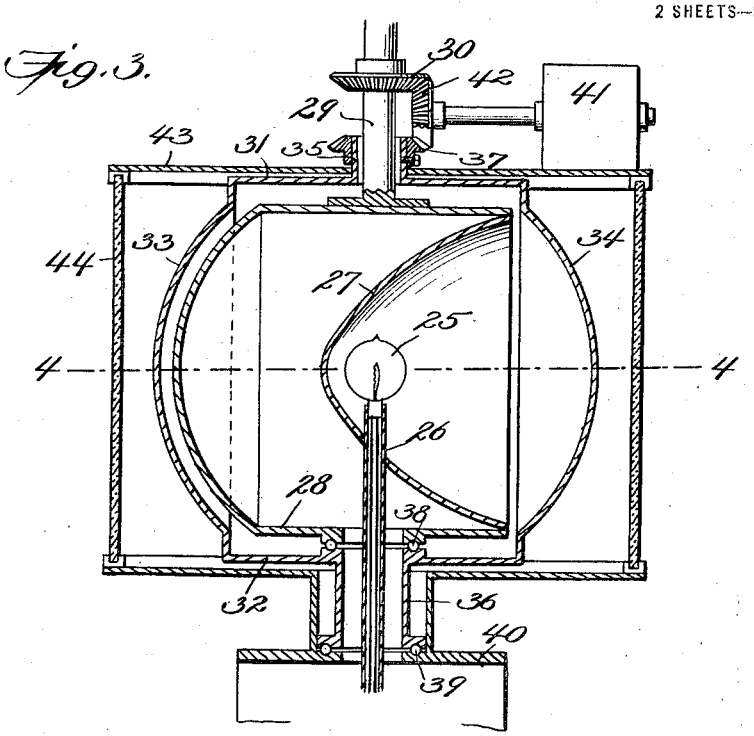
Figure 3 represents a central vertical section through an illuminating device constructed in accordance with another embodiment of the invention.
Figure 4:
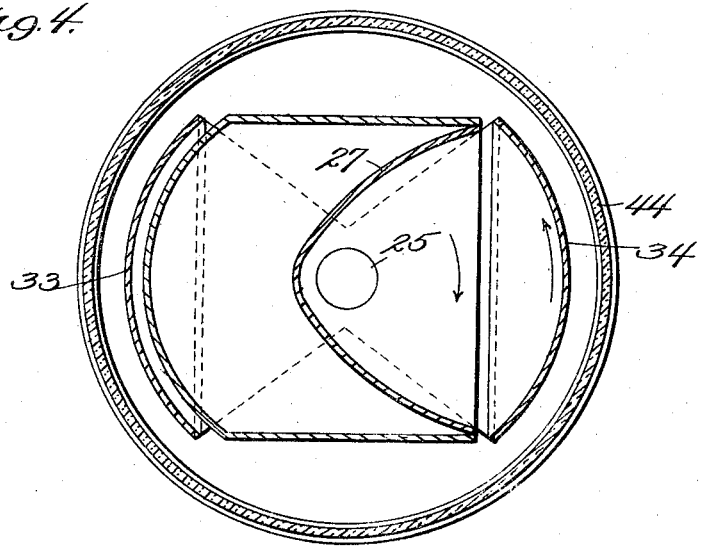
Figure 4 represents a transverse section on the line 4—4 of Figure 3.

The embodiment of the invention shown in Figures 3 and 4 is similar in general, to that shown in Figures 1 and 2, although a double shutter is used. In this embodiment of the invention, an incandescent electric lamp 25 is shown as the source of light, it being mounted in a stationary tube 26 through which the wires for supplying electric current to the filament of the lamp, may extend, the lamp and tube being stationary or non-revoluble, and the filament of the lamp constituting the axis or focus of the illuminating device and the light projector in the form of a reflector 27, is mounted in a reflector carrier 28 which has an upper journal 29 which is provided with a bevel gear 30 for driving it in one direction. The shutter which surrounds the reflector carrier, comprises upper and lower heads 31 and 32 and diametrically opposite light intercepting portions or blinds 33 and 34, the peripheral portions of the shutter between the light intercepting portions 33 and 34 being cut away at diametrically opposite sides, as will appear from Figure 4. The shutter is revolubly supported by upper and lower journals 35 and 36, the upper journal being hollow and surrounding the shaft 29 and provided with a driving gear 37, while the lower journal is also hollow so as to surround the lamp-supporting tube 26, and anti-friction bearings 38 and 39 are preferably interposed between the journal 36 and the reflector carrier and a stationary base or support respectively, the base 40 being mounted on a post or suitable support. An electric or other motor 41, having a bevel gear 42 thereon to mesh with the gears 30 and 37, may be employed to revolve the reflector and the shutter simultaneously in reverse directions, and in order to eliminate or minimize air resistance to the rotation of these elements, a housing 43 having a glass or other transparent peripheral portion 44, preferably encloses the shutter and reflector, this housing being conveniently supported on the base 40, as shown.

In the embodiment of the invention shown in Figures 3 and 4, if the reflector and the shutter are revolved at the same speed, but in reverse directions, as indicated by the arrows in Figure 4, the light will be projected from the reflector on different radii, and the light beam from the reflector will be intercepted with double the frequency as compared with the embodiment shown in Figures 1 and 2, owing to the use of a double-bladed shutter, as compared with the single-bladed shutter shown in Figures 1 and 2, and hence the effect of continuous illumination can be obtained at a lower speed of revolution of the reflector and shutter. The illuminating device, as shown in Figures 3 and 4, is particularly adapted for general illumination of the area surrounding the illuminating device, for the reason that the beam of light from the reflector will be intercepted by the shutter four times during each revolution of the reflector, and hence the light will be projected on four different radii. If the reflector and the shutter are revolved at equal speed in reverse directions, the light beams will be projected on radii 90° apart.

In both embodiments of the invention, the effect of continuous illumination can be obtained, because while the light beam is projected intermittently on any given radius, the speed of revolution of the reflector and shutter may be such that the light beam will be projected in any given direction, or on any given radius at a sufficiently high frequency to have the effect on the eyes of observers of continuous illumination, due to persistence of vision. The reflector concentrates and intensifies the light so that the light is projected to a greater distance and the degree of illumination is much higher than if a lamp or source of light were used without a reflector, and by intercepting the beam of light from the reflector, by the use of a shutter, flicker is eliminated or minimized.

It will be understood that the number of blades on the shutter can be varied, one or more blades being used as desired and also these blades may be of any desired width or shape.

It will also be understood that while in the construction shown the shutter and reflector are arranged to revolve at equal speed, this is not necessarily so, as the relative speeds of the shutter and reflector may vary, the desired result being to produce in effect a succession of flashes of brilliant light with intervening periods of darkness, these flashes of light and periods of darkness alternating so rapidly that either the eye of the observer does not perceive the periods of darkness at all, or the perception of these periods of darkness is but slight, the general effect upon the eye being continuous illumination. This results from the circumstance that the human eye is capable of receiving separate impressions up to a certain number per second, but beyond that number, the impressions in effect become merged into one another, and hence the impressions appear to be continuous instead of intermittent. This phenomenon is known as "persistence of vision." If the flashes of light and the periods of darkness are too widely separated or occur at too low a frequency, or if the flashes of light and the periods of darkness are disproportionate to one another, then the eye will be able to distinguish between the flashes of light and the periods of darkness. Under such conditions, persistence of vision operates only incompletely and instead of illusion of steady illumination, the recurring flashes of light and periods of darkness will be perceptible to the eye as a "flicker." This flicker is very objectionable in illuminating devices, since it causes eye strain in proportion to the amount of flicker. If the flicker is excessive, it is highly injurious to the eyes. It has been found that if the flashes of light and the periods of darkness be equal and at the rate of about forty-eight or more of each per second, the effect will be, to all intents and purposes, that of continuous illumination.

The illuminating means provided by the present invention enables a blending or dissolving effect to be obtained at a lower rate of speed of revolution of the light as compared with arrangements in which the light alone revolves. The effect of continuous illumination is thus obtained in a very advantageous manner.

It is also to be understood that the openings in the shutter, between the blades, may be closed with a suitable transparent material which will eliminate or reduce to a minimum air resistance and when such an arrangement is used, the outer casing 15—16 and its transparent peripheral portion 17 may be dispensed with.

The invention is not confined to a shutter having any particular number of blades, as the circumferential or peripheral speed of the shutter, the character of current used, whether direct or alternating, the candle power of the lamp and the speed of revolution of the reflector have to be considered. For instance, when using alternating current, care should be taken to avoid bringing the shutter blade or blades into substantial synchronism or step with the alternations, as such synchronism would be likely to produce a waving effect of the light; that is to say, the brightness of the light would alternately increase and diminish, due to a slight difference in phase between the alternations of the current and the movements of the shutter blade or blades. However, in some instances, as, for example, in advertising devices, where a waving effect is desired, substantial synchronism between the shutter blade or blades and the alternations of the current supplied to the lamp may be adopted.

For continuous illumination, the speed of revolution of the reflector is preferably about sixteen or more revolutions per second and the shutter is preferably operated and arranged to intercept the projected light about forty-eight or more times per second. These respective speeds, or the speed of one of the elements, could be reduced when a waving or flicker effect, such as sometimes used for advertising purposes, is desired.

I claim as my invention:—

1. An illuminating device comprising a source of light, revoluble means for concentrating such light into a beam and projecting such beam, a revoluble shutter for intermittently intercepting said beam, and means for simultaneously revolving said concentrating and projecting means and shutter in reverse directions.

2. An illuminating device comprising a source of light, a reflector for concentrating such light into a beam and projecting such beam, a revoluble shutter for intercepting said beam, and means for simultaneously revolving the reflector and shutter in reverse directions.

3. An illuminating device comprising a source of light, a reflector having its focus coincident with said source of light and revoluble about the source of light as an axis, a shutter revoluble concentrically of the axis of revolution of the reflector and operative to intermittently intercept the light from the reflector, and means for concurrently revolving the reflector and shutter in reverse directions.

4. An illuminating device comprising a source of light, a reflector for concentrating such light into a beam and projecting such beam, a revoluble shutter for intercepting said beam, and means for simultaneously revolving the reflector and shutter in reverse directions and at equal speed.

In testimony whereof I have hereunto set my hand in presence of two subscribing witnesses.

WALTER H. COOK.

Witnesses:
   CHAS. J. TRUCK,
   JAMES W. HAGGARD.